(12) United States Patent
Brozell et al.

(10) Patent No.: US 9,162,780 B2
(45) Date of Patent: Oct. 20, 2015

(54) PREPARING A SEALING SURFACE OF A CONTAINER

(71) Applicant: Owens-Brockway Glass Container Inc., Perrysburg, OH (US)

(72) Inventors: Brian J Brozell, Maumee, OH (US); Brian J Chisholm, Sylvania, OH (US); Joseph E Olsavsky, Waterville, OH (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 271 days.

(21) Appl. No.: 14/045,354

(22) Filed: Oct. 3, 2013

(65) Prior Publication Data

US 2015/0096268 A1    Apr. 9, 2015

(51) Int. Cl.
| | |
|---|---|
| B65B 7/28 | (2006.01) |
| B65B 61/00 | (2006.01) |
| B08B 9/28 | (2006.01) |
| B65D 51/20 | (2006.01) |
| C03C 23/00 | (2006.01) |
| C03C 17/25 | (2006.01) |
| B08B 5/02 | (2006.01) |

(52) U.S. Cl.
CPC ... *B65B 7/28* (2013.01); *B08B 9/28* (2013.01); *B65B 7/2878* (2013.01); *B65B 61/00* (2013.01); *B65D 51/20* (2013.01); *C03C 17/253* (2013.01); *C03C 23/007* (2013.01); *C03C 23/0075* (2013.01); *B08B 5/023* (2013.01)

(58) Field of Classification Search
CPC ...... B65B 61/00; B65B 7/2878; B65B 7/168; B65B 3/02; B67B 2201/03; B67B 3/00; B67C 2007/00; B67C 7/00; B65D 51/20

USPC .......... 53/452, 467, 471, 477, 478, 141, 286, 53/290, 296–298, DIG. 2

See application file for complete search history.

(56) References Cited

U.S. PATENT DOCUMENTS

| | | | |
|---|---|---|---|
| 1,949,901 A | | 3/1934 | Cosh |
| 2,074,382 A | | 3/1937 | Ford |
| 2,387,213 A | | 10/1945 | Chew et al. |
| 2,658,011 A | * | 11/1953 | Price .......................... B08B 9/28 134/171 |
| 2,811,975 A | | 11/1957 | Tatibana |
| 3,047,417 A | | 7/1962 | Melrose |
| 3,103,067 A | | 9/1963 | Dixon |
| 3,448,743 A | | 6/1969 | Berry |
| 3,475,243 A | * | 10/1969 | Scalora ................... B65B 51/20 156/272.4 |
| 3,856,498 A | | 12/1974 | Campagna et al. |

(Continued)

FOREIGN PATENT DOCUMENTS

| | | | | |
|---|---|---|---|---|
| DE | 3036831 A1 | 5/1982 | | |
| GB | 2092567 A | * | 8/1982 | ................ B67B 5/00 |

(Continued)

OTHER PUBLICATIONS

EPO machine translation of DE 3036831, retrieved Aug. 26, 2015, 10 pages.*
JPO machine translation of JP 2002-104475, retrieved Aug. 26, 2015, 7 pages.*
PCT International Search Report and Written Opinion, Int. Serial No. PCT/US2014/054488, Int. Filing Date: Sep. 8, 2014, Applicant: Owens-Brockway Glass Container Inc., Mail Date: Dec. 22, 2014, 10 pages.

*Primary Examiner* — Stephen F Gerrity

(57) ABSTRACT

A method of preparing a sealing surface of a container for application of a seal. A lip of the container may be heated, rinsed, and dried to establish the sealing surface. Then the seal may be applied to the sealing surface.

20 Claims, 1 Drawing Sheet

(56) References Cited

U.S. PATENT DOCUMENTS

| | | | |
|---|---|---|---|
| 3,909,289 A | 9/1975 | Foucart et al. | |
| 3,911,640 A * | 10/1975 | Rausing | B67C 7/0073 53/110 |
| 4,185,419 A * | 1/1980 | Ilk et al. | C03B 33/095 451/1 |
| 4,260,438 A | 4/1981 | Dembicki et al. | |
| 4,311,247 A | 1/1982 | Dembicki et al. | |
| 4,324,601 A | 4/1982 | Dembicki et al. | |
| 4,389,266 A | 6/1983 | Dembicki et al. | |
| 4,396,655 A | 8/1983 | Graham et al. | |
| 4,421,580 A | 12/1983 | Dembicki et al. | |
| 4,442,129 A * | 4/1984 | Niwa et al. | B65B 7/2878 156/321 |
| RE32,109 E | 4/1986 | Dembicki et al. | |
| 4,645,550 A * | 2/1987 | DuBois | B65B 7/2878 156/69 |
| 4,738,080 A | 4/1988 | Stockebrand | |
| 4,771,903 A | 9/1988 | Levene et al. | |
| 5,026,431 A * | 6/1991 | Skolnik et al. | B65D 25/14 110/236 |
| 5,195,298 A * | 3/1993 | Baranowski | B65B 55/02 156/281 |
| 5,305,583 A * | 4/1994 | Linner | B65B 7/2878 156/69 |
| 5,603,200 A * | 2/1997 | Calvano | B65B 3/02 53/426 |
| 6,099,923 A | 8/2000 | Kitei | |
| 6,733,836 B2 * | 5/2004 | Bourne | C03C 17/328 427/307 |
| 7,222,470 B2 * | 5/2007 | Ribi | B65B 7/165 53/141 |
| 2001/0049001 A1 | 12/2001 | Mueller | |
| 2004/0221615 A1 | 11/2004 | Postupack et al. | |

FOREIGN PATENT DOCUMENTS

| | | | |
|---|---|---|---|
| GB | 2325429 A | 11/1998 | |
| JP | 58-176137 A * | 10/1983 | C03B 29/00 |
| JP | 2002104475 A | 4/2002 | |

* cited by examiner

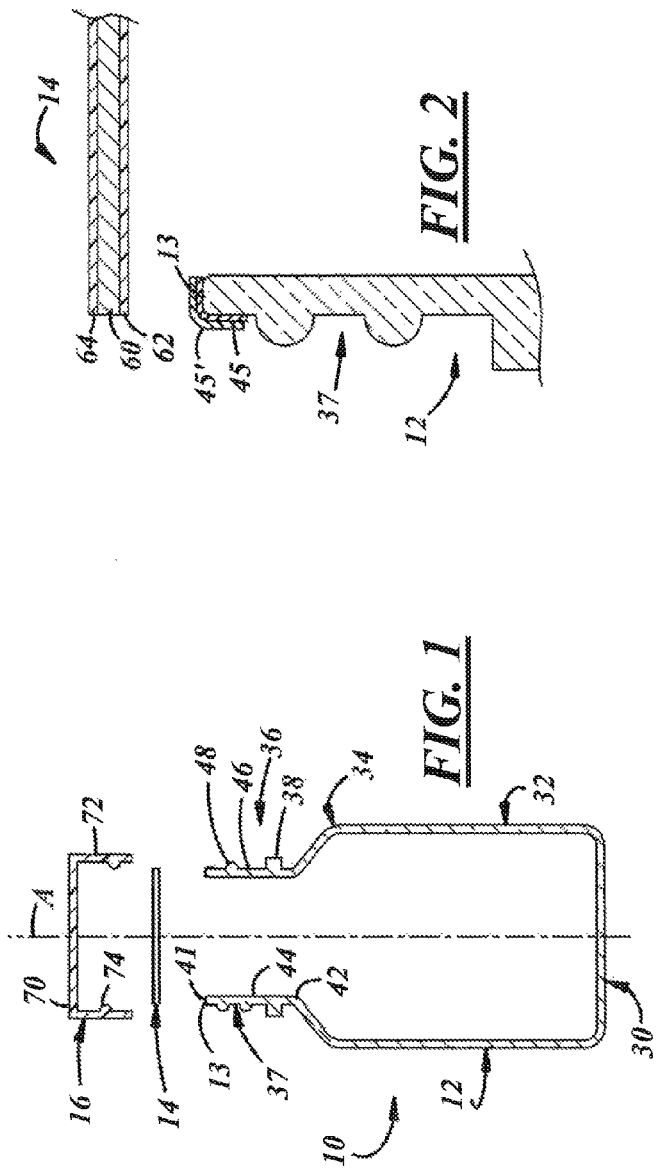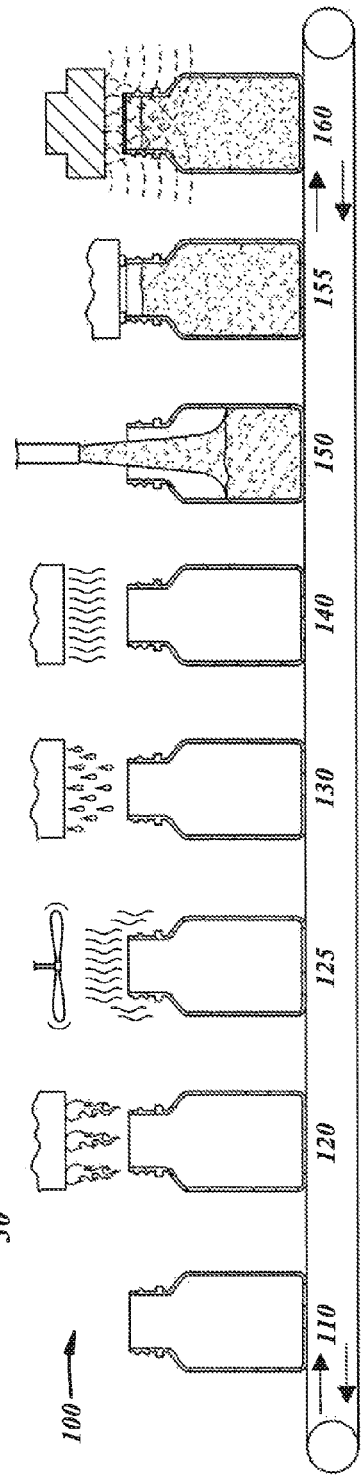

PREPARING A SEALING SURFACE OF A CONTAINER

The present disclosure is directed to methods of packaging and preparing sealing surfaces of containers.

BACKGROUND AND SUMMARY OF THE DISCLOSURE

Various sealing processes have been developed for sealing containers. For example, U.S. Pat. No. 4,396,655 discloses a method involving first heating a container lip or rim surface by flame treatment to oxidize the material existent thereon, coating the lip with a thin coating of a silane compound, and then applying a second thin coating of an ethylene acrylic acid (EAA) copolymer. The container is filled and then fusion sealed using a thin foil membrane having a thin Surlyn ionomer layer over its sealing surface—the EAA coating of the container fusion bonds to the Surlyn layer of the membrane.

A general object of the present disclosure, in accordance with one aspect of the disclosure, is to provide a sealed, glass container for carrying product.

The present disclosure embodies a number of aspects that can be implemented separately from or in combination with each other.

A method of preparing a sealing surface of a glass container for application of a seal in accordance with one aspect of the present disclosure includes heating the sealing surface, rinsing the sealing surface with a rinsing fluid, and then drying the sealing surface.

In accordance with another aspect of the disclosure, there is provided a method of manufacturing sealed containers carrying product that includes preparing a sealing surface of a container for receiving a seal, placing product into the container, and applying the seal to the sealing surface. The preparation of the sealing surfaces further may include heating at least a lip of the container, then cooling at least the lip, then rinsing at least the lip, and drying at least the lip.

BRIEF DESCRIPTION OF THE DRAWINGS

The disclosure, together with additional objects, features, advantages and aspects thereof, will be best understood from the following description, the appended claims and the accompanying drawings, in which:

FIG. 1 is an exploded sectional view of a package including a container, a seal, and a closure in accordance with an illustrative embodiment of the present disclosure;

FIG. 2 is an enlarged fragmentary view of the package shown in FIG. 1; and

FIG. 3 is a schematic diagram illustrating a process of preparing a sealing surface of a glass container for application of a seal in accordance with another illustrative embodiment of the present disclosure.

DETAILED DESCRIPTION OF PREFERRED EMBODIMENTS

FIG. 1 illustrates an embodiment of a package 10 that includes a container 12 having a lip 13, a liner or seal 14, and a closure 16, as will be discussed in further detail herein below. The container 12 may be composed of glass and, more particularly, may be produced in accordance with illustrative embodiments of a glass manufacturing process disclosed herein below. The lip 13 may be a generally axially facing end surface, which is transverse, but not necessarily exactly perpendicular to a longitudinal central axis A of the container 12.

The following detailed description discloses a method of coupling the seal 14 to a sealing surface over the lip 13 according to a sequence of steps that include heating the lip 13 of the container, cooling the lip 13, rinsing the lip 13, and thereafter drying the lip 13, prior to sealing, fusing, bonding, or otherwise coupling the seal 14 to the container 12.

The container 12 may be of any suitable shape, and may include a jug, jar, bottle, other food or beverage container, or any other suitable container. The container 12 may include a base 30 at one axial end upon which the container may be supported, a body 32 extending axially from the base 30, a shoulder 34 extending radially and axially from the body 32, and a neck 36 extending axially from the shoulder 34. As used herein, the term axial includes oriented generally along a longitudinal axis of the closure, container, or package and may include but is not limited to a direction that is strictly parallel to a container longitudinal central axis A.

The body 32 and neck 36 may be generally cylindrical, as illustrated, or they may be tapered or of any other suitable shape. The neck 36 may include an external surface 46 having a capping flange or bead 38, the lip 13, a junction 42 between the shoulder 34 and the neck 36, and an interior surface 44. The neck 36 also may include a neck finish 37, which may include an external surface 46, and one or more closure retention elements 48 projecting from the external surface 46, or the like, for cooperation with corresponding portions of the closure 16. The elements 48 may include threads or thread segments, as illustrated, or bayonet features, snap-fit features, or any other suitable closure retention features. As used herein, the term thread segment includes whole, partial, multiple, and/or an interrupted thread, thread segment, and/or lug. In one illustrative embodiment, the container 12 has snap-fit features.

The lip 13 may include an axial outward end surface, and it may have an inner edge defining an opening 41 to the container 12. The lip 13 may be generally flat and may be perpendicular with respect to axis A or may be at an angle with respect thereto. More specifically, it may extend radially outwardly with respect to the axis A, or it may extend both axially and radially outwardly with respect to the axis A. In some embodiments, the width of the lip 13 may be between 2.5 mm and 5 mm (e.g., a flat surface of the width may be approximately 2.0 mm). In some implementations, the lip 13 may include a circumferential step-down or lip; i.e., the step-down may have a secondary end surface located axially inwardly. In at least one embodiment, the secondary surface may be axially displaced towards the base 30 approximately 1 mm. In other embodiments, the lip may be bullnozed or otherwise curved.

In at least some embodiments, the neck 36, the lip 13, and at least a portion of the exterior surface 46, may have one or more coatings 45 applied thereto during manufacture (see FIG. 2). For example, the coating(s) 45 may cover the width of the lip 13 and may extend axially towards the base 30 along the exterior surface 46. In some embodiments, the coating(s) 45 may establish the sealing surface for the seal 14 and, in other embodiments, the lip 13 without the coating(s) 45 may establish the sealing surface for the seal 14. As used herein, the term "lip" will include embodiments where the lip 13 is uncoated and/or coated with the coating(s) 45. Examples of hot end coatings include monobutyltin trichloride (or MBTT), tin chloride ($SnCl_4$), and titanium tetrachloride ($TiCl_4$). Examples of cold end coatings include polyethylene wax, and various other commercially available cold end coatings including Duracote™.

The container 12 may be of one-piece integrally formed construction, preferably glass or plastic construction. (The term "integrally formed construction" does not exclude one-piece integrally molded layered glass constructions of the type disclosed for example in U.S. Pat. No. 4,740,401, or one-piece glass bottles to which other structure is added after the bottle-forming operation.) In one embodiment, the container 12 may be fabricated in press-and-blow or blow-and-blow glass container manufacturing operations.

The seal 14 may be a thin sheet of one or more materials, and the sheet may be sized and shaped for being sealably coupled to a sealing surface of the container 12, for example, over the coating 45 on the lip 13 of the container 12. In the illustrative embodiment of FIGS. 1 and 2, the seal 14 includes a disc having a diameter at least slightly larger than the opening 41. The seal 14 may include any metal, plastic, or composite and, in one embodiment, the seal has multiple layers 60, 62, 64. In the illustrated embodiment, a primary layer 60 may be foil, which may be metallic, for example, aluminum foil, or may be polymeric, for instance polyethylene terephthalate. A secondary layer 62 may be a coating on one face of the seal 14 which when assembled is located adjacent the lip 13 of the container 12. The layer 62 may be of any suitable material; in this implementation, the layer 62 is illustrated as an ethylene acid polymer (e.g., ethylene acrylic acid (EAA) or a commercially available material, e.g., Surlyn™) having an acid value of 75-100. It should be appreciated that the acidity or acid value may be greater than 100 and that the greater number of carboxylic acid groups, the greater the seal's adherability. Another secondary layer 64 is illustrated on the opposite face; this layer may be optional and/or decorative and may include paper, plastic, or other suitable coatings. Other arrangements are also possible; e.g., the entire primary layer 60 may be coated with EAA or other suitable material rather than coating only one face, or for example, only the periphery region of the layer 60, which contacts the lip sealing surface, may be coated with EAA. In addition, other secondary layers may be stratified with respect to the primary layer; e.g., one side of the primary layer may include two or more secondary layers. In addition, some secondary layers may be corrosive-resistant for containers carrying aggressive product.

The closure 16 may be any suitable device for retaining the contents or product of the container 12 after the seal 14 is removed. As shown in FIG. 1, the closure 16 may include a cap or any other suitable type of closure, and may be composed of plastic, metal, glass, ceramic, or any other suitable material. In any case, the closure 16 may include a base wall 70 and an annular outer skirt 72 extending from the base wall 70 and having one or more internal container retention elements 74 projecting from an internal surface thereof for cooperation with corresponding portions of the container 12. The elements 74 may include threads or thread segments, as illustrated, or bayonet features, snap-fit features, or any other suitable container retention features. In one illustrative embodiment, the closure 16 has snap-fit features. Furthermore, some embodiments may not include the closure 16.

In production, and generally speaking, typical glass container manufacturing includes a "hot end" and a "cold end." The hot end may include one or more glass melting furnaces to produce a glass melt, one or more forming machines to form the glass melt into glass containers, and one or more applicators to apply a hot-end coating to the glass containers. The "hot end" also may include an annealing lehr, or at least a beginning portion of the annealing lehr, for annealing the glass containers therein. Through the lehr, the temperature may be brought down gradually to a downstream portion, cool end, or exit of the lehr. The "cold end" may include an end portion of the annealing lehr, applicators to apply one or more cold-end coatings to the glass containers downstream of the annealing lehr, inspection equipment to inspect the containers, and packaging machines to package the containers. Thus, a hot end coating is a coating applied at the hot end of the glass container manufacturing process, and a cold end coating is a coating applied at the cold end of the glass container manufacturing process.

In conjunction with the above description, the container 12 may be produced by the following glass container manufacturing process, which may or may not include all of the disclosed steps or be sequentially processed or processed in the particular sequence discussed, and the presently disclosed manufacturing process and marking methods encompass any sequencing, overlap, or parallel processing of such steps.

First, a batch of glass-forming materials may be melted. For example, a melting furnace may include a tank with melters to melt soda-lime-silica to produce molten glass. Thereafter, the molten glass may flow from the tank, through a throat, and to a refiner at the downstream end of the furnace where the molten glass may be conditioned. From the furnace, the molten glass may be directed toward a downstream forehearth that may include a cooling zone, a conditioning zone, and a downstream end in communication with a gob feeder. The feeder may measure out gobs of glass and deliver them to a glass container forming operation.

Next, the glass gobs may be formed into containers, for example, by forming machines, which may include press-and-blow or blow-and-blow individual section machines, or any other suitable forming equipment. Blank molds may receive the glass gobs from the feeder and form parisons or blanks, which may be at a temperature, for example, on the order of 900-1100° C. Blow molds may receive the blanks from the blank molds and form the blanks into glass containers, which may be at a temperature, for example, on the order of 700-900° C. Material handling equipment may remove the glass containers from the forming machines and place the containers on conveyors or the like.

Also, the formed glass containers may be annealed, for example, by an annealing lehr. At an entry, hot end, or upstream portion of the annealing lehr, the temperature therein may be, for instance, on the order of 500-700° C. During this period of time, one or more of the coatings 45 (e.g., a tin coating) may or may not be applied to the neck 36, more specifically, to the lip 13 and at least a portion of the exterior surface 46 of the container 12. In some embodiments, the coating 45 may be applied as a thin continuous film; in other embodiments, the thickness of the coating may vary. Conventional hot end coatings are on the order of about 10-20 CTUs (or coating thickness units as measured by AGR International's Hot End Coating Measurement System (HECM System); 1 CTU is approximately 2 Angstroms) in thickness, at least at the container neck and sealing surface. In accordance with the present disclosure, however, the thickness of the coating(s) 45 may be at least 20 CTUs. While the coating thickness may be greater, in one embodiment, the coating thickness may be about 40 CTUs, i.e. about double current hot end coating thicknesses. In other embodiments, the thickness may be between 20 and 60 CTUs and all ranges and subranges therebetween, for instance, 30-50 CTUs. In further embodiments, the thickness may be even greater than 60 CTUs. Through the lehr, the temperature may be brought down gradually to a downstream portion, cool end, or exit of the lehr, to a temperature therein, for example, on the order of 65-130° C.

Referring to FIG. 3, following the glass container manufacturing process, the containers may then be treated according to a process 100 to sealably enclose contents or product therein by applying the seal 14 to the sealing surface over the lip 13. FIG. 3 illustrates one example of the process. Here, the containers 12 are illustrated on a conveyor belt with arrows indicative of the various steps of the process 100; however, it will be appreciated that the process 100 may or may not be carried out. using a conveyor belt and that the order of the steps may be altered. In addition, some illustrated steps may be omitted and/or other differing steps may be added.

Thus, according to the illustrative implementation, at step 110, the container 12 may be provided according to the manufacturing method just described. Here, the container 12 may or may not be freshly manufactured, and it may or may not have one or more coatings 45 applied in the vicinity of the lip 13. Additionally in the providing step 110, the container may be cleaned, prepared, etc. for the product or contents.

At step 120, at least a portion of the container 12 may be heated or annealed. In the illustration, the coated or uncoated lip 13 is heated using a flame, for example, an oxygen rich gas flame, for instance, a natural gas flame, an oxy-propane flame, or the like. At least one implementation, the lip 13 is heated for a duration of approximately 5 or more seconds to increase the temperature at the sealing surface to greater than 180° C. For example, the lip 13 may be heated for 10-20 seconds at temperatures between 260-315° C.; e.g., for 15 seconds at 290° C. Heating or annealing the lip 13 burns off organics either absorbed from the atmosphere or accidentally from cold end sprays and, in at least some instances, may also clean and oxidize the coated or uncoated lip 13 enabling it to accept the seal 14 more readily. In addition, if a cold end coating has been applied, the heating step 120 may at least partially remove the coating (e.g., flame treatment may remove Duracote™). Artisans of ordinary skill will appreciate various techniques which may be applied to heat the lip 13 according to this duration and temperature. In addition, techniques other than a gas flame may be employed to localize heat at the lip 13. For example, other techniques or treatments for heating the lip 13 may include use of an atmospheric plasma, a corona (e.g., a corona treatment), one or more infrared lamps or devices, one or more heat cartridges, etc. For example, atmospheric plasma treatment techniques include blown-arc plasma discharge, blown-ion plasma discharge, and variable chemistry plasma treatment, just to name a few. In at least one implementation, the lip 13 may be treated at a rate of 50 millimeters per second (mm/sec) to 150 mm/sec using the Enercon Dyne-A-Mite™ IT Plasma Surface Treater or the Enercon Dyne-A-Mite™ VCP (Variable Chemistry Plasma) Treater, just to name a couple commercially available types of equipment. In some embodiments, a combination of techniques and treatments may be used.

At step 125, the containers 12 may be cooled. This cooling may inhibit thermal shock to the containers and additionally may reduce the length of the cycle or manufacturing time. More specifically, the cooling step may bring the temperature of the glass down so that there is a differential in temperature between the glass and the subsequent rinsing fluid that is less than 38° C., so as to avoid cracking the glass when rinsed. Step 125 may include passive or active cooling. For example, passive cooling may include merely removal of the containers from a heat source in the lehr and allowing a suitable amount of time to pass. For example, the containers 12 may be removed from the lehr for a period of 1 to 4 hours at an ambient temperature of approximately 32° C. to bring the temperature of the glass down to less than 71° C. And for example, active cooling may include exposure to forced air, refrigerated or otherwise, or a refrigerated environment, or any other suitable active cooling configuration to bring the temperature of the glass down to less than 71° C. For example, the containers 12 may be actively cooled for a period between 15 and 60 seconds and, more particularly, between 15 and 45 seconds. The quantity and duration of the cooling will vary depending on the glass temperature resulting from the heating step. In one example, use of plasma heating in step 120 may reduce or completely eliminate the need for any active cooling step. Those of ordinary skill in the art will appreciate the various ways in which to cool the containers.

At step 130, after the lip 13 is treated with heat, it may be rinsed with a rinsing fluid. A variety of rinsing fluids may be used; examples include water, ammonia based products (e.g., ammonium sulfide (($NH_4)_2S$)), acetic acid ($CH_3COOH$), various chelating agents, and other glass cleaners. Suitable chelating agents and glass cleaners (and other suitable ammonia based products) will be known to artisans of ordinary skill in the art. In this illustrated embodiment, the rinsing fluid is de-ionized water. While the entire container 12 may be rinsed, according to this implementation, at least the lip 13 is rinsed. In addition, the temperature of the container 12 may vary during the rinsing step 130; e.g., the container 12, in at least some implementations, may be rinsed immediately following the cooling step 125 of the lip 13. The rinsing fluid may include a liquid and also may include a gas as well; e.g., at least the lip 13 also may receive pressurized steam in step 130. The rinsing step may enable the formation of hydroxyl groups (e.g., silicon hydroxide or SiOH) at the lip 13. In addition, the rinsing step 130 may remove sodium and/or other impurities that have been raised to the exterior surface of the lip 13 as a result of the heating or flame treating step 120. The rinsing fluid may be provided at about 10-66° C. including all ranges and subranges therebetween, for example, 24-52° C.

Next, at step 140, the container 12 and/or its sealing lip 13 may be dried. The drying step also may be performed in various ways including conduction, forced or compressed air (including blowers and air blades), suction drying, towel drying, evaporative drying, flame or heat drying, any other suitable drying technique, or any combination of these techniques. Where forced air is applied, it may be desirable to pre-filter the air for particulates. In addition, the forced air temperature may be elevated. And, although towel drying may not be preferable, if it is implemented, it may be desirable to use towels dampened with isopropyl alcohol capable of leaving minimal residue, lint, etc. (e.g., commercially available towels having these characteristics include Kimwipes™).

At step 150, the lip 13 of the container 12 is dry and the product or contents may be located therein. During this step, the contents may be isolated from the prepared sealing lip 13 in order to avoid contamination that might affect the sealing process in step 160. It will be appreciated that in other embodiments, the step 150 also could occur prior to the drying step 140; therefore, the lip 13 may have moisture thereon while the container 12 is filled with product.

At step 155, and although not preferred, one or more additional coatings 45' may be applied to the lip 13 to improve bonding, sealing, etc. The coating 45' may be a polymeric coating and one commercially available example of the coating 45' is AquaSeal™. The additional coating 45' may be applied to supplement or complement the process described above to ensure good sealing for particularly challenging applications. Preferably, the process does not require the additional coating 45' and, more preferably, is carried out without the additional coating 45'

And at step 160, once the contents have been placed, located, or otherwise deposited in the container 12, the seal 14 may be applied, coupled, bonded, etc. to the sealing surface on the lip 13 using methods including induction or conduction sealing or heating techniques. For example, using an induction technique, the seal 14 having a primary layer 60 of aluminum may be located adjacent to the lip 13, for example, with the coating 45 located therebetween. Where the seal 14 is a disc, the disc may be located generally axially located with respect to the longitudinal axis A while the one or more coatings 45, 45' are in close proximity to the lip 13. In addition, the periphery of the disc may extend radially outwardly of the lip 13. After the disc is adequately located, the container 12 and seal 14 may be located in the vicinity of a magnetic field strong enough to induce eddy currents within the aluminum material of the seal 14 (e.g., via the conveyor belt). The eddy currents may increase the temperature of the aluminum thereby providing sufficient heat to couple the seal 14 to the sealing surface on the lip 13. The sealing step 160 may seal the contents within the container 12 such that the coupling of the seal 14 to the container 12 may be resistant to leakage even in high humidity environments. Any hydroxyl groups which have formed by the re-hydration of the lip 13 (during the rinsing step 130) may accept the seal 14 and increase the integrity of the coupling. In some embodiments, step 160 may be repeated (e.g., to strengthen the bond between the seal 14 and the container 12). The duration of the repeated step 160 may vary; i.e., the duration of the induction or conduction may be shorter, longer, or equal to that of the initially performed conduction step 160. In at least one embodiment, the duration of the repeated step 160 may be between 5 and 15 seconds.

It may be desirable to minimize the duration of time between the heat treatment step 120 and the sealing step 160. In at least some embodiments, step 160 may be performed immediately following step 150 or step 155. Thus, the duration between steps 120 and 160 may be less than or equal to 5 minutes. In other embodiments, the duration may be between 0-4 hours.

It should be appreciated that the previously described process 100 may not have any cold end coatings on the container 12; i.e., coatings applied at the cold end of the container manufacturing process.

In at least one embodiment, the container 12 need not have coatings 45 or 45', and the heat treating step 120 of the container 12 is an atmospheric plasma treatment. In addition, in this embodiment, the coating 62 (e.g., a polymer) on the seal 14 is also treated with a plasma treatment in step 120. This plasma treatment of the lip 13 and seal 14 may be conducted in a steam environment. Thereafter, the seal 14 and the container lip 13 also may undergo steps 130 and 140 before the seal 14 is applied or adhered to the container 12 at step 160. The rinsing step 130 may include rinsing the seal 14 and the container lip 13 with de-ionized water or treating the seal 14 and the container lip 13 with steam instead. The plasma treatment may clean and functionalize the surfaces of the glass of the container 12 and/or polymer of the seal 14. Plasma treating in the steam environment and/or the addition of water during rinsing may allow newly functionalized bond sites to react with the water and create —OH functional groups for better bonding when the seal 14 is coupled to the container 12. Thus, in this implementation, the plasma treatment of both the container 12 and the seal 14 may extend the life of the bond created in step 160 without the use of any special coatings 45, 45' on the container 12.

In one embodiment of treating the seal 14, the seal 14 may be treated in step 155. For example, the seal may receive coating 45' before step 160 (e.g., being treated with AquaSeal™ (e.g., AquaSeal 1307)). In some instances, this coating 45' may be applied only at the periphery of the seal 14.

In addition, as previously discussed, some steps of the process 100 may be omitted; e.g., it has been empirically determined that the seal 14 may be applied to the sealing surface on the lip 13 while omitting the rinsing step 130 (e.g., with de-ionized water). However, it was also empirically determined that by the inclusion of the rinsing step 130, the seal integrity increased and the life of the seal 14 to the container 12 was increased, even in higher humidity testing.

With one or more of the aforementioned embodiments, a package may be produced to include a "hot fill" product carried in a container and being sealed by a seal that enables a 6 to 18 month shelf life for the product. The sealing described herein may be particularly suitable for product having a liquid component or other moisture-content. This represents a significant advance in the art of glass packaging, and provides consumers with new quality packaging choices.

There thus has been disclosed methods of preparing seating surfaces of containers, that fully satisfy all of the objects and aims previously set forth. The disclosure has been presented in conjunction with several illustrative embodiments, and additional modifications and variations have been discussed. Other modifications and variations readily will suggest themselves to persons of ordinary skill in the art in view of the foregoing discussion. For example, the presently disclosed container and method have been discussed in terms of a glass composition and glass container manufacturing process, but the disclosure likewise may apply to plastic and plastic container manufacturing. The disclosure is intended to embrace all such modifications and variations as fall within the spirit and broad scope of the appended claims.

The invention claimed is:

1. A method of preparing a sealing surface of a glass container for application of a seal, which includes the steps of:
    (a) heating a lip of the container for more than 5 seconds to increase a temperature of the lip to greater than 180° C., then
    (b) rinsing the lip with a rinsing fluid, and then
    (c) drying the lip to establish the sealing surface.

2. The method set forth in claim 1 wherein said step (a) includes at least one of a gas flame, an atmospheric plasma treatment, a corona treatment, an infrared lamp treatment, or a heat cartridge treatment.

3. The method set forth in claim 1 wherein said rinsing fluid includes at least one of water, acetic acid, an ammonia based product, a chelating agent, or a glass cleaner, wherein water includes at least one of de-ionized water or steam.

4. The method set forth in claim 1 wherein said step (c) includes at least one of the following drying techniques: conduction, forced air, suction, wiping, evaporation, or heating.

5. The method set forth in claim 1 wherein the lip prior to said step (a) has a continuous tin coating in an amount greater than or equal to 20 coating thickness units (CTUs).

6. The method set forth in claim 1 wherein said rinsing fluid includes at least one of de-ionized water or steam.

7. The method set forth in claim 1 wherein step(a) is carried out for 10-20 seconds and the temperature is between 260-315° C.

8. The method set forth in claim 1 wherein a step of cooling the lip occurs between said step (a) and said step (b).

9. The method set forth in claim 1 including:
    (d) filling the container with product, and then
    (e) applying a seal to the sealing surface.

10. The method set forth in claim 9 wherein said seal includes a foil seal.

11. The method set forth in claim 10 wherein said foil seal includes a polymeric material on at least a container side of the seal.

12. The method set forth in claim 11 wherein, prior to applying the seal to the sealing surface in step (e), the polymeric material on the seal receives a plasma treatment, a rinsing treatment, and a drying treatment.

13. The method set forth in claim 9 wherein the time lapse between said step (a) and said step (e) is less than or equal to 4 hours.

14. The method set forth in claim 9 wherein step (e) is performed using induction or conduction heating.

15. A method of manufacturing sealed containers carrying product, which includes the steps of:
   (a) preparing a sealing surface of a container for receiving a seal, wherein the preparing step includes the steps of:
      (1) heating at least a lip of the container for more than 5 seconds to increase a temperature of the lip to greater than 180° C., then
      (2) cooling at least the lip, then
      (3) rinsing at least the lip with a rinsing fluid, and
      (4) drying at least the lip to establish the sealing surface,
   (b) placing product into the container, and
   (c) applying the seal to the sealing surface.

16. The method set forth in claim 15 wherein said step (a)(1) includes at least one of a gas flame, an atmospheric plasma treatment, a corona treatment, an infrared lamp treatment, or a heat cartridge treatment.

17. The method set forth in claim 15 wherein said rinsing fluid of said step (a)(3) includes at least one of water, acetic acid, an ammonia based product, a chelating agent, or a glass cleaner, wherein water includes at least one of de-ionized water or steam.

18. The method set forth in claim 15 wherein said step (a)(4) includes at least one of the following drying techniques: conduction, forced air, suction, wiping, evaporation, or heating.

19. The method set forth in claim 15 wherein the container is a glass container.

20. The method set forth in claim 15 wherein step (c) is performed using induction or conduction heating.

* * * * *